Sept. 21, 1971     S. H. QUANBECK     3,606,928
RELEASABLE CHISEL PLOW, CLAMP AND SHANK HOLDER
Filed March 14, 1969
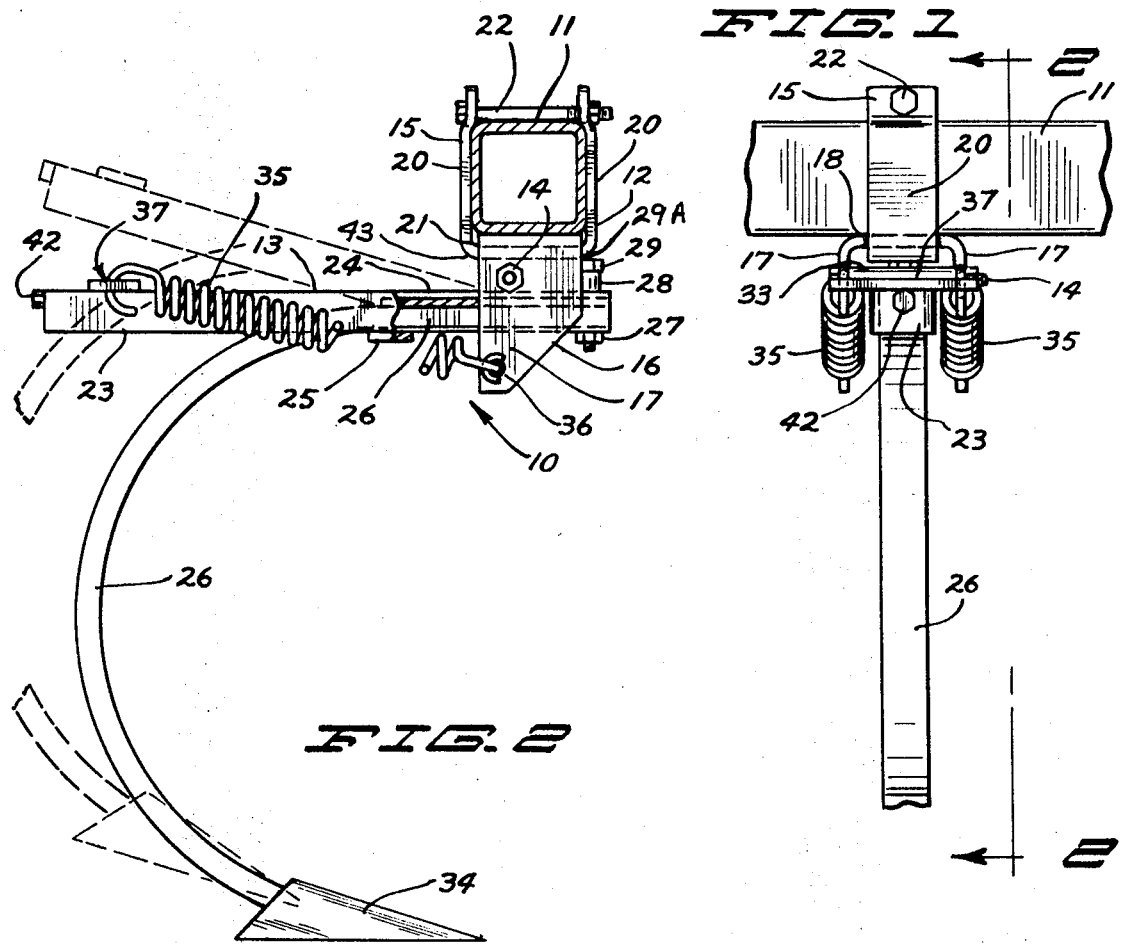
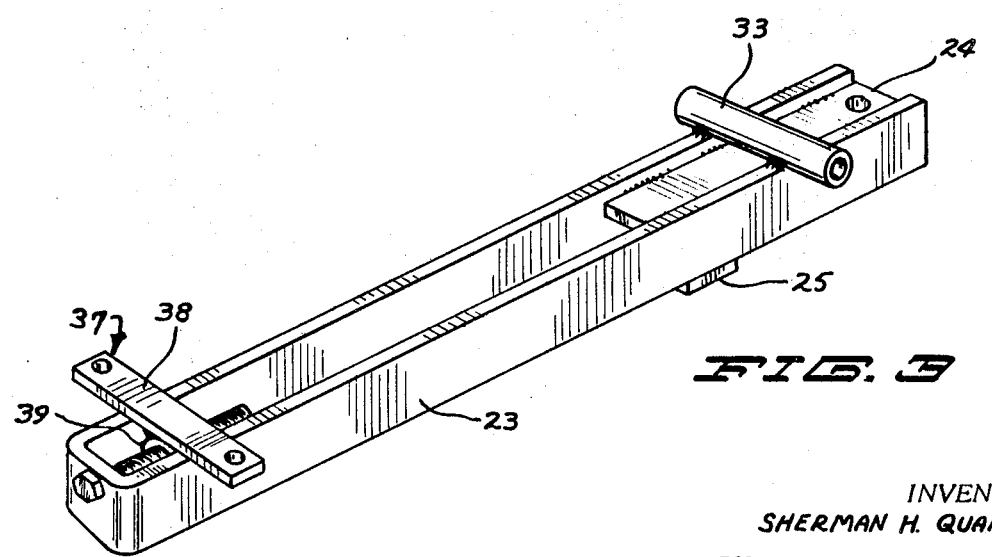
INVENTOR.
SHERMAN H. QUANBECK
BY
Dugger, Peterson, Johnson & Westman
ATTORNEYS

United States Patent Office 3,606,928
Patented Sept. 21, 1971

3,606,928
RELEASABLE CHISEL PLOW, CLAMP AND SHANK HOLDER
Sherman H. Quanbeck, Aneta, N. Dak. 58212
Filed Mar. 14, 1969, Ser. No. 807,347
Int. Cl. A01b *61/04*
U.S. Cl. 172—265
7 Claims

ABSTRACT OF THE DISCLOSURE

A chisel plow or cultivator clamp and shank holder utilizing two U-shaped brackets, one of which acts as a support for the shank, and the other of which acts as a clamp to clamp the shank holder onto a plow support beam. The shank holder includes resilient means for holding the shank in working position and letting it release when it strikes an obstruction.

BACKGROUND OF THE INVENTION (1) Field of the invention

The present invention relates to resilient clamps for use with chisel plows or field cultivators that will yield to permit obstructions to pass under the plowing tool, will automatically reset, and will give good tooth action and uniform penetration.

(2) Prior art

Several different types of chisel plow clamps have been advanced, for example, the clamp shown in U.S. Pat. No. 3,098,529 to Wade et al. which shows a housing for holding a plow shank with compression springs for retaining it in plowing position. Canadian Pat. No. 650,464 also shows a plow shank holder, but in this structure the springs are attached directly to the shank in one form of the invention and utilizes compression springs extending ahead of the clamp itself in another form. Another type of spring mounted standard for an earth working tool or plow shank is shown in U.S. Pat. No. 3,098,531 to Hunter.

Thus, the desirability of having a good spring loaded shank has been shown in the prior art, but yet these fail to meet all of the desired requirements of simplicity of manufacture, strength, wearability, speed of resetting, and foolproof operation at low cost.

SUMMARY OF THE INVENTION

The present invention discloses a clamping member for holding earth working tools in working position which is simple to manufacture, very stable, and which gives reliable release action when the earth working tool strikes an obstruction. The tool is automatically resetting, has adjustable stops so that the working or home position of the earth working tool can be adjusted, and further includes a wide pivot support so that there is less wear from twisting forces on the earth working tool and less opportunity for the unit to bind and freeze up. The clamp can be used on chisel plows or on field cultivators.

In the drawings,

FIG. 1 is a rear elevational view of a chisel plow clamp made according to the present invention and shown installed on a cross frame of a chisel plow;

FIG. 2 is a side elevational view of the device of FIG. 1 taken as on line 2—2 in FIG. 1; and FIG. 3 is a perspective view of the shank holder with parts removed for sake of clarity.

DESCRIPTION OF THE PREFERRED EMBODIMENT

A plow clamp illustrated generally at 10 is mounted onto a square tubular frame member 11. The frame member 11 is part of a multiple chisel plow frame wherein a number of plow clamps 10 are mounted onto the frame and spaced at regular intervals, and have earth working tools which will work the ground as the unit moves along. The square tubular frames are in common use, in multiple unit assemblies.

The frame member 11 extends transversely to the direction of movement of the plow. The plow clamp itself comprises a support bracket assembly 12 to which a shank mounting assembly 13 is pivotally mounted for movement about a transverse pivotal axis. The pivot axis of the shank mounting assembly is the axis of a mounting bolt 14.

The support bracket assembly as shown comprises two U-shaped brackets each formed from a single strip of material. A first or lower mounting bracket 16, and a second or upper mounting bracket 15. The lower mounting bracket 16 has a pair of legs 17, 17 and a base 18. The upper mounting bracket has legs 20, 20 and a base 21. The two brackets are interlocked so that the legs 17, 17 extend downwardly, and the legs 20, 20 of the upper bracket 15 extend upwardly. The base member 21 of the upper bracket is on the inside of the base member 18 of the lower bracket, and the two brackets are welded together.

The legs 20, 20 as shown fit tightly against the side surface of the frame member 11 and are offset slightly where they would go over the top of the frame member so that as the single fastening bolt 22 which is used in the form shown, is tightened, the transition portions between the offset portions will bear against the corners of the frame member 11 and act like ramp surfaces to force the base 18 tightly against the bottom surface of the square frame member 11 to clamp and stabilize the assembly into position. The base member 18 is of a substantial width so that it provides a wide support surface against the frame 11 when it is clamped in place, and the single bolt 22 will accomplish this purpose.

The shank holder assembly 13 comprises a shank mounting member 23. The mounting member is made up as a U-shaped frame work having side legs and a rear base member and having a plate 24 welded between the legs of the U-shaped framework adjacent the forward portions thereof and a bar 25 welded between the legs on the bottom edges thereof to the rear of the mounting bracket 16. The mounting member thus is made into a box like structure. The bar 25 is spaced from the plate 24 so that a shank 26 for a chisel plow can be slid (with a close fit) between the top surface of the bar 25 and the bottom surface of the plate 24, and between the legs of member 23 and the forward end of this shank is then bolted into place with a suitable bolt 27 at the forward end of the plate 24. The shank closely fits between the legs of the mounting member and is snuggly held between the legs of the member 23 and the plate 24 and bar 25 so that the shank cannot twist. The bolt 27 holds the shank from moving free.

The bolt 27, as shown, has a spacer 28 thereon between the top surface of the plate 24 and the head of the bolt so that the head 29 of the bolt 27 is raised above the top surface 24 to provide a stop member which will abut against the base portion 21 of the upper bracket as at 29A to stop the plow shank in a working position about its pivot 14.

The spacers 28 can be of different lengths, so that the stopped position of the bracket 13 about its pivot bolt 14 and thus the normal working position of the shank can be changed.

A cross tube or sleeve 33 is welded to the legs forming the U-shaped bracket 23, and serves as a pivot or bearing member on the bolt 14 as the clamp assembly pivots. The tube 33 is of substantial length to provide good wearing surfaces and support so that the pivot members do not wear excessively during use because of the twisting and load on the shank.

The shank itself can have an earth working tool 34 at the bottom thereof which will plow the ground or do what ever is necessary.

The shank 26 and the earth working tool 34 are resiliently held in working position through the use of a pair of tension springs 35, 35 which have spring ends hooked as at 36 to the depending portions of the legs 17, 17, and the opposite ends of the springs are hooked into a spring adjust device 37. The spring adjusting device comprises a transverse bar 38 having a threaded housing 39 at the bottom thereof. A screw 42 is passed through an opening provided in the end bar of the U-shaped member 23 and is threaded into the housing 39. The springs hold the bar 38 down against the upper edges of the legs of the U-shaped member 23 and the screw prevents the springs from going toward the frame 11. By adjusting the screw, the tension exerted by the springs on the shank 26 can be changed. The force from the springs is sufficient to hold the earth working tool in working position under ordinary circumstances but will permit the shank to pivot upwardly as shown in dotted lines to clear rocks and the like.

The legs 17, 17 in the lower bracket 16 are spaced sufficiently far apart to prevent the springs 35 from interfering with the shank as the shank moves upwardly about its pivot when it encounters an obstruction. This permits the wide pivot sleeve 33 to be used and also the width of base 18 is increased to give stability. The U-shaped member 23 is of sufficient length so the springs 35 can be long enough and strong enough to provide sufficient force on the shank.

The stopped working position of the shank can be easily changed, by changing the spacers 28. When the working tool 34 encounters an obstruction, it will be urged upwardly about the axis of bolt 14 (the sleeve or tube 35 will pivot on the bolt) the springs 35 will be tensioned. As the U-shaped member 23 and the shank move upwardly about the pivot axis, the effective leverage arm of action of the springs reduces (the line of force moves closer to the pivot) so that the force rate does not go up substantially, although the force does continue to increase as the lever pivots. This reduces the chance of getting exceedingly high force on the shank to cause breakage of the earth working tool 34 or the shank 26 but still permits very high clearance. It also gives better tooth action for improved tillage and uniform penetration. The U-shaped member 23 will abut against the rear edge corner 43 of the upper bracket member 15 for a tripped stopped position when it is at its maximum tripped position. This will also insure that the springs 35 will not be over stressed.

The single adjustment screw or bolt 42 permits both springs to be adjusted quickly and efficiently together. The points 36 with the springs attached to legs 17 and can be reinforced with part circular pads to prevent wear there as well.

When used for field cultivators, the mounting member 23 can be bent upwardly (the legs of member 23 would be bent so the rear portions are inclined upwardly and rearwardly) to give a modified spring action.

What is claimed is:

1. A clamp assembly for mounting an earth working tool on a frame comprising a frame member, support bracket means to support said clamp assembly on said frame member including a first bracket having a base and a pair of substantially parallel spaced apart legs attached to said base at opposite edges thereof, an earth working tool comprising a shank, a mounting member having elongated parallel legs and a rear cross member joining said legs, a plate member extending between the legs of said mounting member adjacent the forward portion thereof and being fixedly attached thereto, a bar member spaced below said plate member and extending between the legs of said mounting member, said shank passing between the plate member and bar member and between the legs of said mounting member, and fastening means to attach the leading end of said shank to said plate member, pivot means to pivotally attach said mounting member to said first bracket between the legs of said first bracket, said mounting member extending rearwardly from said pivot means, a pair of tension springs one on each side of said mounting member, said tension springs being attached at first ends thereof to the legs of said bracket at attachment points positioned below a horizontal plane passing through the pivot axis of said pivot means, an adjusting bracket mounted for adjustable sliding movement with respect to said mounting member, second end of said tension springs being attached to opposite ends of siad adjusting bracket to urge said mounting member and earth working tool toward a normal working position, said bracket legs being spaced to permit the shank and mounting member to move between said tension springs without contacting the springs when the mounting member pivots against the action of said springs.

2. The clamp assembly as specified in claim 1 wherein said fastening means comprises a bolt having a head, the head of the bolt being positioned above said plate member and between said plate member and a portion of said support bracket means, spacer means between said plate and said bolt head to position said bolt head at a predetermined relation to said plate member, said bolt head striking a portion of said support bracket means when the earth working tool is in the desired working position.

3. The clamp assembly as specified in claim 1 wherein said mounting member extends rearwardly from said pivot means a substantial distance, said adjustable bracket being positioned adjacent the rear of the mounting member, and wherein the attachment point of said tension springs to said legs of said first bracket is positioned in relation to the pivot means so that as the shank and mounting member move from a working position against the force from said tension spring means, the line of force from said tension springs moves closer to said pivot means.

4. A clamp assembly for mounting an earth working tool on a frame that includes a rectilinear frame member having a planar lower surface comprising support bracket means, said support bracket means including a base member and a pair of spaced apart downwardly depending legs joined to the base member, means to clamp said base member firmly against the lower surface of said frame member, a mounting member comprising a pair of spaced apart, parallel elongated legs and means holding said legs at forward and rear ends thereof to comprise a rigid mounting frame, an elongated pivot sleeve fixedly attached to said legs of said mounting member and extending laterally outwardly therefrom and being of size to slidably fit between and closely clear the depending legs of said support bracket means, a pivot pin means mounting said pivot sleeve between the legs of said support bracket means, an earth working tool having a shank, means to fixedly fasten said shank to said mounting member between the legs of said mounting member, and tension spring means mounted to the legs of said support bracket means below said pivot sleeve and to said mounting member adjacent to the rear of said mounting member whereby said tension spring means give a forward component of force and resist upward pivoting movement of said mounting member about said pivot pin means, said legs of said support bracket means being spaced from the legs of the mounting member a sufficient distance to permit said mounting member to move upwardly along side said tension spring means as said mounting member pivots upwardly.

5. A clamp assembly for mounting an earth working tool on a frame comprising support bracket means including a first bracket having a base and a pair of substantially parallel legs attached to said base at opposite edges thereof, a second bracket having a base and substantially parallel legs fixed to said second bracket base, said first and second brackets being interlocked and the base members of the first and second brackets being fixed together, the legs of said second bracket extending in opposite direction from the legs of said first bracket and the planes of the legs of one bracket being at substantially 90° to the planes of the legs of the other bracket, a single bolt extending between the legs of said second bracket and adapted to clamp said legs together onto a frame member, an earth working tool comprising a shank, a mounting member, means to fasten said shank to said mounting member, pivot means to pivotally attach said mounting member between the legs of said first bracket, said mounting member extending rearwardly from said pivot with respect to the normal direction of movement of said earth working tool, tension spring means, means to mount the tension spring means to the rear portions of said mounting member and to mount said tension spring means to said first bracket so as to urge said mounting member in a direction about its pivot toward a working position of said earth working tool.

6. The clamp assembly as specified in claim 5, a frame member, said frame member comprising a square tubular member, and wherein the base of said first bracket rests against the lower surface of said square tubular member, and the legs of said second bracket are clamped against the side surfaces of said square tubular member which are at right angles to said surface on which the base of said first bracket rests, and wherein said single bolt extends across the fourth surface of said square tubular member on a side thereof opposite from said base, said single bolt being the sole means for clamping said support means onto said frame member.

7. The clamp assembly as specified in claim 6 wherein the outer end portions of said legs of said second bracket are offset toward each other out of the plane of the main part of the legs, and transition portions being formed between the offset portions, said transition portions being positioned to interfere with the corresponding corners of square frame member as said single bolt is tightened to provide ramp-like surfaces forcing the base of said first bracket means against the frame member.

References Cited
UNITED STATES PATENTS

| | | | |
|---|---|---|---|
| 3,012,617 | 12/1961 | Anderson | 172—264 |
| 3,098,529 | 7/1963 | Wade et al. | 172—710X |
| 3,468,382 | 9/1969 | Quanbeck | 172—710X |
| 3,493,055 | 2/1970 | Van Peursem | 172—710X |

FOREIGN PATENTS

| | | | |
|---|---|---|---|
| 158,432 | 3/1953 | Australia | 172—710 |
| 249,664 | 5/1963 | Australia | 172—710 |
| 594,258 | 3/1960 | Canada | 172—265 |
| 89,168 | 6/1960 | Denmark | 172—265 |
| 825,615 | 7/1949 | Germany | 172—265 |
| 1,015,165 | 12/1965 | Great Britain | 172—265 |

CLYDE I. COUGHENOUR, Primary Examiner

U.S. Cl. X.R.

172—710